US009230538B2

United States Patent
Maruta (10) Patent No.: US 9,230,538 B2
(45) Date of Patent: Jan. 5, 2016

(54) VOICE RECOGNITION DEVICE AND NAVIGATION DEVICE

(75) Inventor: Yuzo Maruta, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 116 days.

(21) Appl. No.: 13/991,491

(22) PCT Filed: Apr. 8, 2011

(86) PCT No.: PCT/JP2011/002103
§ 371 (c)(1),
(2), (4) Date: Jun. 4, 2013

(87) PCT Pub. No.: WO2012/137263
PCT Pub. Date: Oct. 11, 2012

(65) Prior Publication Data
US 2013/0253933 A1    Sep. 26, 2013

(51) Int. Cl.
*G10L 15/20* (2006.01)
*G10L 15/00* (2013.01)
(Continued)

(52) U.S. Cl.
CPC ............. *G10L 15/00* (2013.01); *B60R 16/0373* (2013.01); *G10L 15/20* (2013.01); *G10L 2025/786* (2013.01)

(58) Field of Classification Search
CPC ....... G10L 15/00; G10L 15/04; G10L 15/265; G01C 21/36
USPC ......... 704/231, 233, 239, 243, 246–249, 251, 704/253, 257, 270–275
See application file for complete search history.

(56) References Cited

U.S. PATENT DOCUMENTS 6,259,892 B1 * 7/2001 Helferich ........................ 340/7.2
6,744,882 B1    6/2004 Gupta et al.
(Continued)

FOREIGN PATENT DOCUMENTS

CN    201611572 U    10/2010
DE    102005014447 A1    10/2005
(Continued)

OTHER PUBLICATIONS

Euler, "Grundkurs Spracherkennung," 1st Edition, Wiesbaden: Vieweg-Verlag, Chapter 3.3 Aufbau eines komplexen Systems, Apr. 2006, pp. 19-21.
(Continued)

*Primary Examiner* — Vijay B Chawan
*Assistant Examiner* — Rodrigo Chavez
(74) *Attorney, Agent, or Firm* — Birch, Stewart, Kolasch & Birch, LLP (57) ABSTRACT

A voice recognition device includes a vehicle state detecting unit for detecting a vehicle state of a vehicle having the voice recognition device mounted thereon, and an acoustic data matching unit for matching an acoustic feature value converted by a sound analyzing unit with a recognition dictionary stored in a recognition dictionary storage unit to recognize a voice input to a microphone. The device also includes a recognition parameter setting unit for setting a recognition parameter at the time when the voice input to the microphone is recognized, and a control unit for instructing the recognition parameter setting unit to change the recognition parameter when the vehicle state detected by the vehicle state detecting unit satisfies a predetermined condition.

15 Claims, 9 Drawing Sheets

(51) Int. Cl.
*B60R 16/037* (2006.01)
*G10L 25/78* (2013.01)

(56) References Cited

U.S. PATENT DOCUMENTS

| | | | |
|---|---|---|---|
| 6,766,176 | B1 | 7/2004 | Gupta et al. |
| 6,782,364 | B2 * | 8/2004 | Horvitz .................... 704/275 |
| 6,889,189 | B2 * | 5/2005 | Boman et al. ................. 704/270 |
| 2004/0215458 | A1 * | 10/2004 | Kobayashi et al. ........... 704/251 |
| 2004/0239526 | A1 | 12/2004 | Nakajima |
| 2005/0233285 | A1 | 10/2005 | Miyamaru et al. |
| 2005/0233866 | A1 | 10/2005 | Miyamaru et al. |
| 2007/0033043 | A1 * | 2/2007 | Hyakumoto ................ 704/255 |
| 2008/0120106 | A1 * | 5/2008 | Izumida et al. .............. 704/251 |
| 2008/0167868 | A1 | 7/2008 | Kanevsky et al. |
| 2008/0177541 | A1 * | 7/2008 | Satomura .................... 704/251 |
| 2009/0076810 | A1 * | 3/2009 | Matsuo ....................... 704/225 |
| 2009/0192795 | A1 * | 7/2009 | Cech ........................... 704/233 |
| 2009/0222265 | A1 | 9/2009 | Iwamiya et al. |
| 2009/0228276 | A1 * | 9/2009 | Osawa et al. ................ 704/246 |
| 2010/0138099 | A1 * | 6/2010 | Taguchi ........................ 701/29 |
| 2012/0330651 | A1 * | 12/2012 | Obuchi et al. ............... 704/225 |
| 2013/0245936 | A1 * | 9/2013 | Ando et al. .................. 701/501 |

FOREIGN PATENT DOCUMENTS

| | | |
|---|---|---|
| JP | 05-119792 A | 5/1993 |
| JP | 8-297497 A | 11/1996 |
| JP | 09-329458 A | 12/1997 |
| JP | 11-342808 A | 12/1999 |
| JP | 2000-338994 A | 12/2000 |
| JP | 2000-353294 A | 12/2000 |
| JP | 2002-041073 A | 2/2002 |
| JP | 2002-055696 A | 2/2002 |
| JP | 2004-045616 A | 2/2004 |
| JP | 2004-198832 A | 7/2004 |
| JP | 2004-348657 A | 12/2004 |
| JP | 2005-142936 A | 6/2005 |
| JP | 2006-195302 A | 7/2006 |
| JP | 2009-069503 A | 4/2009 |
| JP | 2010-119108 A | 5/2010 |

OTHER PUBLICATIONS

Susen, "Spracherkennung—Kosten, Nutzen, Einsatzmoglichkeiten," VDE Verlag, Chapter 2.2 Maschinelle Spracherkennung, 2.2.1 Grundeinheiten, 1999, pp. 24-26.

* cited by examiner

| Type of Recognition Parameter | Value in Steady Operation State | Value in Abnormal Operation State |
|---|---|---|
| Voice Power Detection Threshold | 40 dB | 60 dB |
| Time-Out Time | 3 Seconds | 8 Seconds |
| Microphone Gain Value | 10 dB | 5 dB (When Immediately Preceding Audio Volume Is 60 dBA)<br>3 dB (When Immediately Preceding Audio Volume Is 100 dBA) |
| ... | ... | ... |

VOICE RECOGNITION DEVICE AND NAVIGATION DEVICE

TECHNICAL FIELD

The present invention relates to a voice recognition device that performs voice recognition in accordance with a usage environment, and a navigation device having the corresponding voice recognition device mounted thereon.

BACKGROUND ART

Conventionally, a technique to adjust a threshold for voice recognition and so on in accordance with a usage (operating) environment of a voice recognition device is proposed. For example, in Patent Document 1, the following voice recognition device is proposed: it is determined whether a vehicle is under a quiet environment or under a noisy environment by comparing a current speed of a vehicle with a reference value, a threshold (detection level) for detecting a section of voice activity under the quiet environment and under the noisy environment based on the said determination result is changed, and the threshold in a case under the noisy environment is set to be higher than that under the quiet environment, which solves an inconvenience such that an erroneous detection of the section of voice activity is rendered due to a sensitive reaction to a minute sound, a level fluctuation in the residual components of an audio sound, or the like.

PRIOR ART DOCUMENTS

Patent Documents

Patent Document 1: Japanese Unexamined Patent Application Publication No. 2002-41073

SUMMARY OF THE INVENTION

Problems to be Solved by the Invention

However, in the foregoing Patent Document 1, the threshold for detecting the section of voice activity is set based on only the information relating to a speaker's voice and noise, and hence the setting of the threshold is not always suitable for the usage environment of the voice recognition device; thus, there is a problem such that a correct recognition result thereof cannot be obtained.

The present invention is made to solve the aforementioned problem, and an object of the invention is to provide a voice recognition device that adjusts the threshold for the voice recognition further taking into consideration the information indicating the usage environment of the voice recognition device other than the speaker's voice and noise.

Means for Solving the Problems

A voice recognition device according to the invention includes: a vehicle state detecting unit for detecting a vehicle state of a vehicle having the said voice recognition device mounted thereon; an acoustic data matching unit for matching an acoustic feature value converted by a sound analyzing unit with a recognition dictionary stored in a recognition dictionary storage unit to recognize a voice that is input to a sound collecting unit; an audio output detecting unit for detecting a volume of a voice signal that is output from an audio device installed within the vehicle; a gain setting unit for setting a voice acquisition gain of the sound collecting unit; a recognition parameter setting unit for setting a recognition parameter at the time when the voice input to the sound collecting unit is recognized; and a control unit for instructing the recognition parameter setting unit to change the recognition parameter when the vehicle state detected by the vehicle state detecting unit satisfies and the volume of the voice signal detected by the audio output detecting unit satisfy a predetermined condition.

Effect of the Invention

According to the invention, it becomes possible to set a threshold for the voice recognition according to the driving state of a user to thus enhance the voice recognition performance.

BEST MODE FOR CARRYING OUT THE INVENTION

In the following, in order to describe the present invention in more detail, embodiments for carrying out the invention will be described with reference to the accompanying drawings.

Embodiment 1

Figure 1:
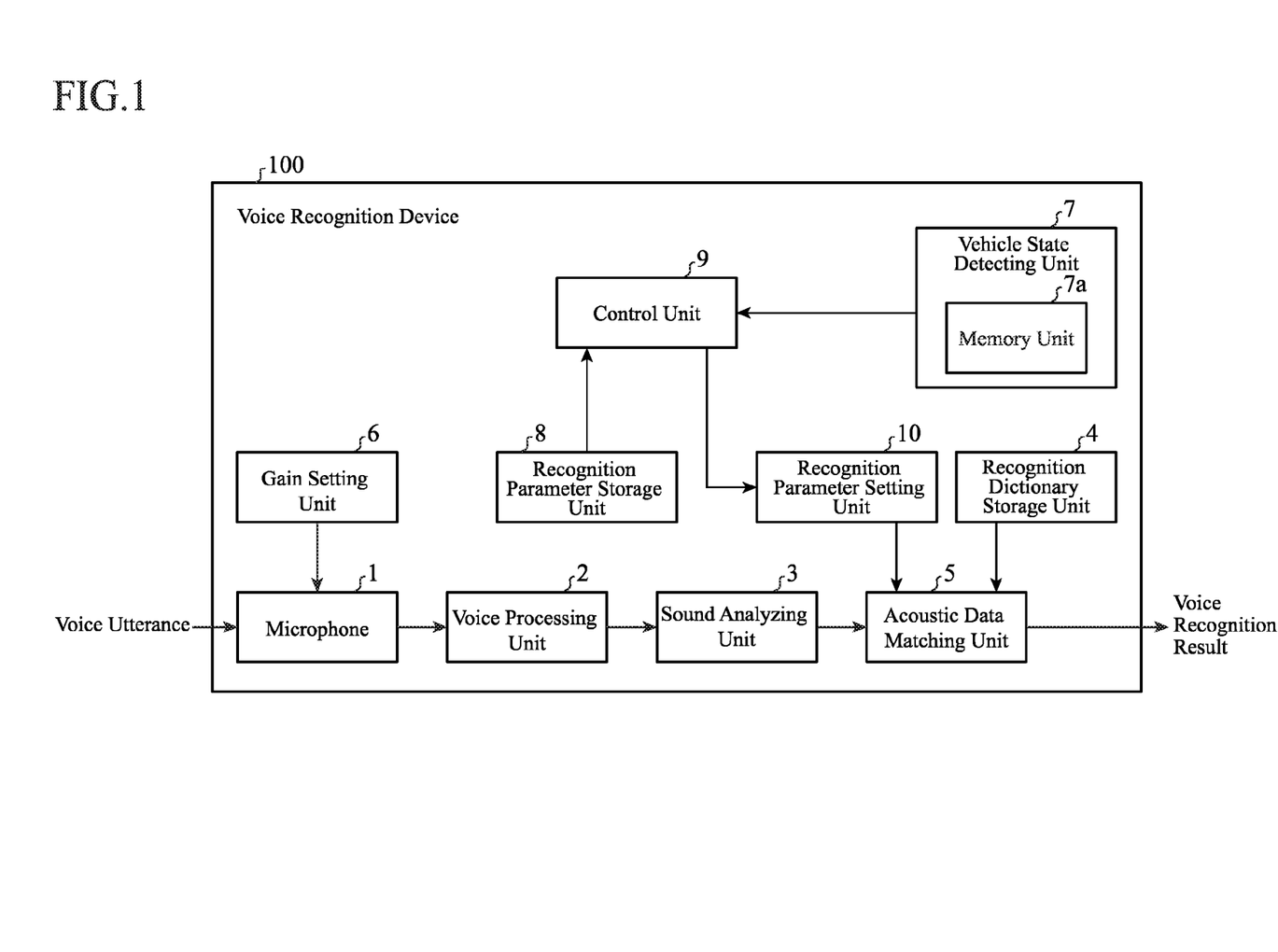
FIG. 1 is a block diagram showing a configuration of a voice recognition device according to Embodiment 1.

FIG. 1 is a block diagram showing a configuration of a voice recognition device according to Embodiment 1 of the invention.

A voice recognition device 100 according to Embodiment 1 is composed of a microphone 1, a voice processing unit 2, a sound analyzing unit 3, a recognition dictionary storage unit 4, an acoustic data matching unit 5, again setting unit 6, a vehicle state detecting unit 7, a recognition parameter storage unit 8, a control unit 9, and a recognition parameter setting unit 10.

The microphone 1 takes in an input voice. The voice processing unit 2 converts the voice of an analog signal taken in by the microphone 1 into a digital signal. The sound analyzing unit 3 analyzes a voice signal converted into the digital signal in the voice processing unit 2, and converts an acoustic feature thereof into an acoustic feature data indicated in time series. The recognition dictionary storage unit 4 stores a recognition dictionary in which a recognition vocabulary is associated with the acoustic feature data. The acoustic data matching unit 5 matches the acoustic feature data with the recognition dictionary, and outputs the most probable voice recognition result. The gain setting unit 6 adjusts the volume of an input to the microphone 1. The vehicle state detecting unit 7 is connected to an in-vehicle network (not shown) to acquire vehicle information such as vehicle speed and steering wheel turning angle of the vehicle. Also, the vehicle state detecting unit 7 has a memory unit 7a for storing the acquired vehicle information. The recognition parameter storage unit 8 stores a parameter table in which types of recognition parameters and values thereof are defined. However, the details of the parameter table will be described later.

The control unit 9 refers to the vehicle information acquired by the vehicle state detecting unit 7 to determine whether the vehicle is in a steady operation state or in an abnormal operation state. Here, the steady operation state is a state in which the vehicle speed is stable, and an abrupt manipulation of the steering wheel, and so on are not carried out. Specifically, there is, for example, a case where the vehicle is running at a constant speed on a highway. On the other hand, the abnormal operation state is a state in which a vehicle is frequently accelerated or decelerated, or the steering wheel is turned greatly. Specifically, there is, for example, a case where the vehicle enters an intersection and turns to the right or left. The control unit 9 holds a determination table in which thresholds for the vehicle information such as the vehicle speed and the steering wheel turning angle are set, and determines whether the vehicle is in the steady operation state or in the abnormal operation state on the basis of whether or not the vehicle information acquired by the vehicle state detecting unit 7 is not less than the threshold. Further, the control unit 9 refers to the parameter table stored in the recognition parameter storage unit 8 to acquire a parameter value according to the operation state of the vehicle.

The recognition parameter setting unit 10 sets the parameter value acquired by the control unit 9 to the acoustic data matching unit 5. As the recognition parameter to be set, for example, a threshold of voice power for detecting a start of an uttered voice, and a silent time (timeout time) for detecting an end of the utterance are set.

Next, the details of the recognition parameter will be described.

The recognition parameter is a numerical value to be set or changed, or a combination of the numerical values in order to enhance the recognition accuracy in the voice recognition. As the recognition parameter to be set to the acoustic data matching unit 5 by the recognition parameter setting unit 10, there are, for example, the threshold of voice power for detecting the start of the uttered voice, the silent time (timeout time) for detecting the end of the utterance, the maximum number of words to be retained in the process of voice recognition processing, and a weighting factor for adjusting a balance of each score according to a linguistic model and an acoustic model.

Figure 2:
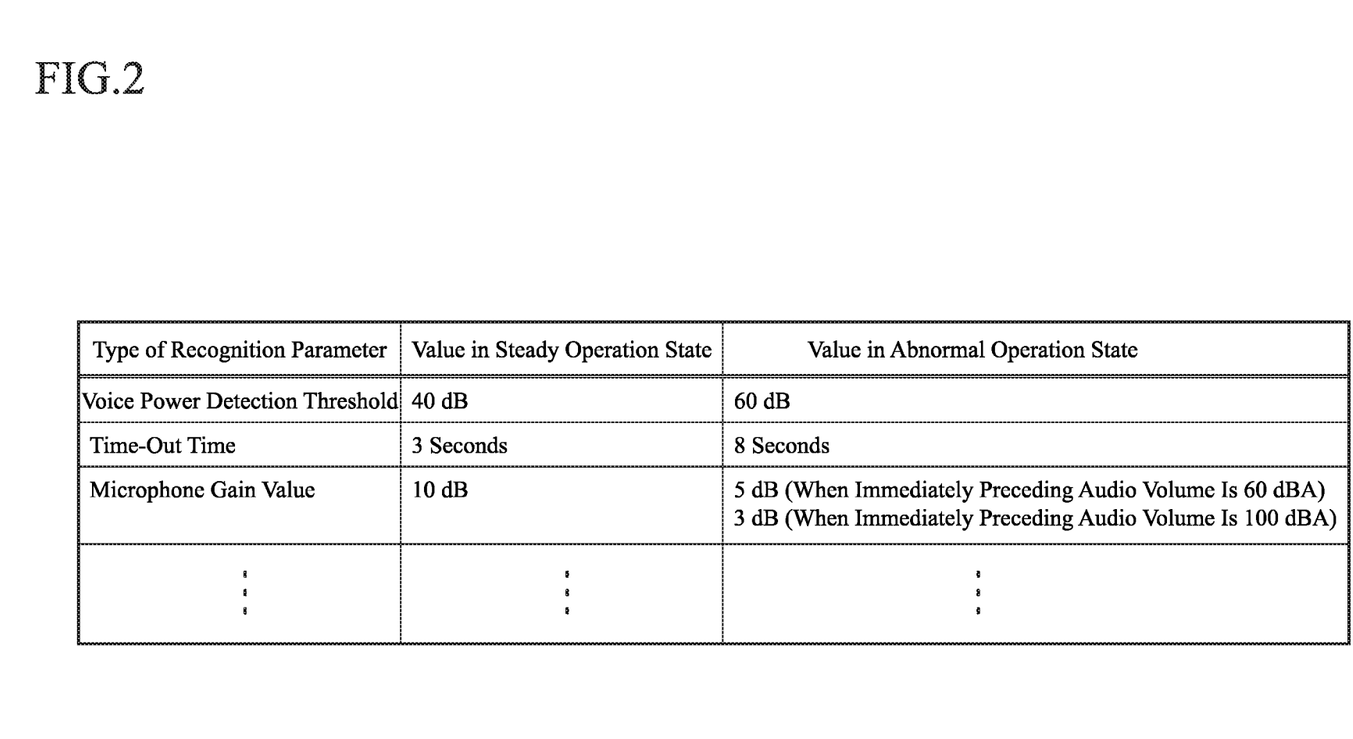
FIG. 2 is a diagram showing an example of a parameter table of the voice recognition device according to Embodiment 1.

FIG. 2 is a diagram showing an example of the parameter table of the voice recognition device according to Embodiment 1.

In the parameter table, regarding each of the recognition parameters of the aforementioned threshold for voice power detection, the timeout time, a microphone gain value, and so on, a value to be set in a case where the vehicle is in the steady operation state and a value to be set in a case where the vehicle is in the abnormal operation state are stored.

When the parameter table of FIG. 2 is used, for example, the threshold of voice power detection is set to 40 dB if it is determined that the vehicle is in the steady operation state in the control unit 9, whereas the threshold of voice power detection is set to 60 dB if it is determined that the vehicle is in the abnormal operation state. Also, the timeout time is set to a lower value such as 3 seconds when the vehicle is in the steady operation state, whereas it is set to a higher value such as 8 seconds when the vehicle is in the abnormal operation state. Incidentally, the types of the recognition parameters and parameter values thereof shown in FIG. 2 can be changed appropriately.

Figure 3:
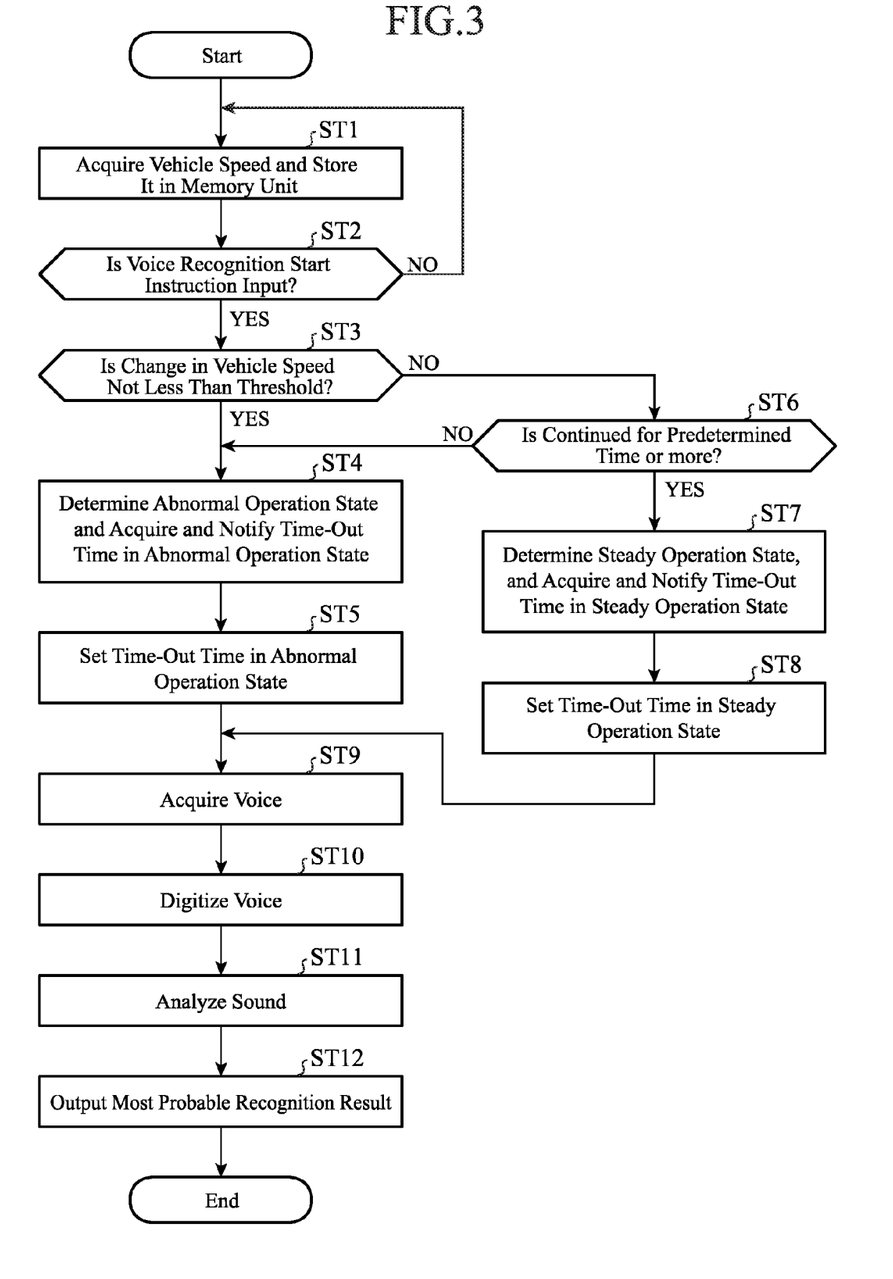
FIG. 3 is a flowchart showing an operation of the voice recognition device according to Embodiment 1.
Figure 4:
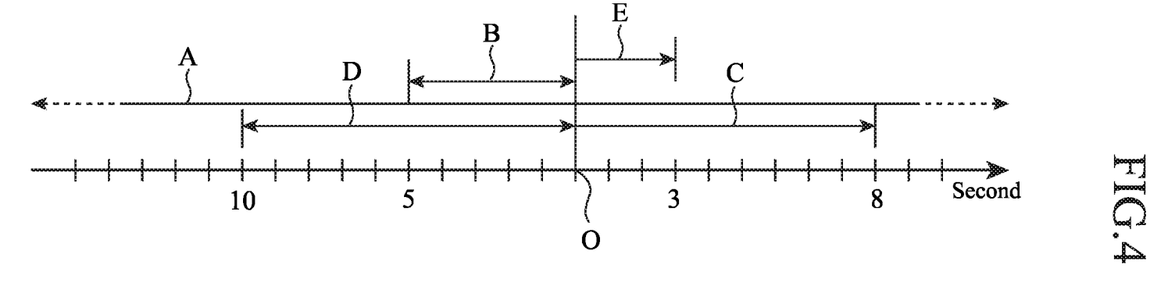
FIG. 4 is an explanatory drawing illustrating data acquisition processing and recognition parameter setting processing by the voice recognition device according to Embodiment 1.

Next, an operation of the voice recognition device 100 will be described with reference to FIGS. 3 and 4. FIG. 3 is a flowchart illustrating an operation of the voice recognition device of Embodiment 1, and FIG. 4 is an explanatory diagram illustrating the acquisition of the vehicle information and the timeout time. It is noted that in the flowchart of FIG. 3, the following configuration is illustrated: a change over time in the vehicle speed that is acquired as the vehicle information is analyzed, and when it is determined that a sudden start and/or a sudden acceleration occur frequently, it is decided that a user is preoccupied with the driving, and hence the timeout time for a voice input to the microphone 1 is set to be longer.

The vehicle state detecting unit 7 continuously acquires the vehicle speed of the vehicle via the in-vehicle network, and stores the acquired vehicle speed information in the memory unit 7a (Step ST1). The acquisition of the vehicle speed of the vehicle at Step ST1 is indicated by A in FIG. 4.

Meanwhile, the control unit 9 determines whether or not a voice recognition start instruction of the user is input through an operation input unit (not shown) or the like (Step ST2). If no voice recognition start instruction is input (Step ST2; NO), the processing returns to Step ST1. In contrast, if the voice recognition start instruction is input (Step ST2; YES), the control unit 9 acquires vehicle speed information in a predetermined time from among the vehicle speed information stored in the memory unit 7a of the vehicle state detecting unit 7 and determines whether or not a change in the acquired vehicle speed information is not less than a threshold (Step ST3). Here, a description will be given of the vehicle information in a predetermined time to be acquired by the control unit 9 with reference to FIG. 4. In FIG. 4, a point O is a point where a voice recognition start instruction is input, and a period B is a period going back for a predetermined time (for example, 5 seconds) from the point O; the vehicle speed information in this period B is acquired, and used to determine whether or not the change is not less than the threshold.

If the change in the vehicle speed is not less than the threshold (Step ST3; YES), it is determined that the vehicle is in the abnormal operation state such that the vehicle makes a sudden start, a sudden stop, or a sudden acceleration; thus, the parameter value of the timeout time in the abnormal operation state is acquired by reference to the parameter table and notified to the recognition parameter setting unit 10 (Step ST4). The recognition parameter setting unit 10 sets the parameter value in the abnormal operation state notified at Step ST4 to the timeout time of the acoustic data matching unit 5 (Step ST5). The timeout time at Step ST5 corresponds to C in FIG. 4; it is presumed that the user is preoccupied with the driving operation, and may take some time to start utterance, so that it is set longer such as 8 seconds.

When the change in the vehicle speed is less than the threshold (Step ST3; NO), the control unit 9 further acquires the vehicle speed information stored in the memory unit 7a of the vehicle state detecting unit 7, and determines whether or not a state in which the change in the vehicle speed is less than the threshold continues for a predetermined time or more (Step ST6). At Step ST6, the vehicle speed information of a period D in FIG. 4 is used to determine whether or not the state in which the change in the vehicle speed is less than the threshold continues for a predetermined time or more. When the state in which the change in the vehicle speed is less than the threshold does not continue for a predetermined time or more (Step ST6; NO), it is determined that the vehicle does not return to the steady operation state yet, and the processing proceeds to Step ST4.

In contrast, when the state in which the change in the vehicle speed is less than the threshold continues for a predetermined time or more (Step ST6; YES), it is determined that the vehicle returns to the steady operation state, and the control unit 9 refers to the parameter table, and acquires the parameter value of the timeout time in the steady operation state, and notifies the recognition parameter setting unit 10 of the value (Step ST7). The recognition parameter setting unit 10 sets the parameter value in the steady operation state notified at Step ST7 to the timeout time of the acoustic data matching unit 5 (Step ST8). The timeout time at Step ST8 corresponds to a period E in FIG. 4; it is presumed that the user does not take much time to start utterance, so that it is set lower such as 3 seconds.

Next, the microphone 1 acquires a voice specifying a command uttered by the user (Step ST9). The voice processing unit 2 digitizes the voice acquired at Step ST9 (Step ST10), and the sound analyzing unit 3 analyzes the voice signal digitized at Step ST10 to convert the same into an acoustic feature data (Step ST11). The acoustic data matching unit 5 matches the acoustic feature data converted at Step ST11 with the recognition dictionary by using the parameter value set at Step ST5 or Step ST8, and calculates the most probable recognition result, and outputs it as a voice recognition result (Step ST12), and then the processing is ended.

Incidentally, although in the flowchart of FIG. 3, the configuration in which the timeout time is set in the acoustic data matching unit 5 is shown, in addition to this, it may also be configured such that the recognition parameter setting unit 10 outputs a stop signal instructing the voice processing unit 2 to stop the introduction of the analog signal within the set timeout time to thus stop the introduction of the voice signal. As a result, power consumption of the voice recognition device 100 can be suppressed.

As described above, according to Embodiment 1, it is configured to include: the recognition parameter storage unit 8 storing the parameter table in which different setting values are specified depending on whether the vehicle is in the steady operation state or in the abnormal operation state; and the control unit 9 determines that the vehicle is in the abnormal operation state when the change over time in the vehicle speed is not less than the threshold to thus acquire from the parameter table the timeout time of the voice recognition in the abnormal operation state, and sets it in the acoustic data matching unit 5 via the recognition parameter setting unit 10, and hence the timeout time can be changed according to the user's driving situation, which enables to perform the voice recognition processing without any timeout even in the case where the user is preoccupied with the driving operation to cause an interval to start utterance.

Further, according to Embodiment 1, it is configured such that in the case where the state in which the change in the vehicle speed is less than the threshold continues for a predetermined time or more, the control unit 9 determines that the vehicle is in the steady operation state and sets the timeout time in the steady operation state, and hence an erroneous detection or recognition of noise that may occur in the case where the timeout time of the voice recognition is set to be longer is suppressed to a minimum to thus suppress degradation of recognition performance thereof.

Incidentally, the times of the period B to the period D shown in the foregoing Embodiment 1 can be changed appropriately. Also, the start point of each of the periods is described as the point O where the voice recognition start instruction is input; however, the start point of each of the periods can also be changed appropriately.

Embodiment 2

Nowadays, it is popular that when an audio device is installed within a vehicle, a driving operation is carried out while an audio (music) is listened to. In such a situation that the audio is reproduced, the loudness of a voice to be uttered by a user changes according to an output volume of the audio immediately before utterance. For example, in the case where the output volume of the audio is higher, the user tends to give utterance in a louder voice. Thus, in Embodiment 2, a configuration is shown to maintain a voice recognition performance even if the user gives utterance in a louder voice than usual since the output volume of the audio is higher.

Figure 5:
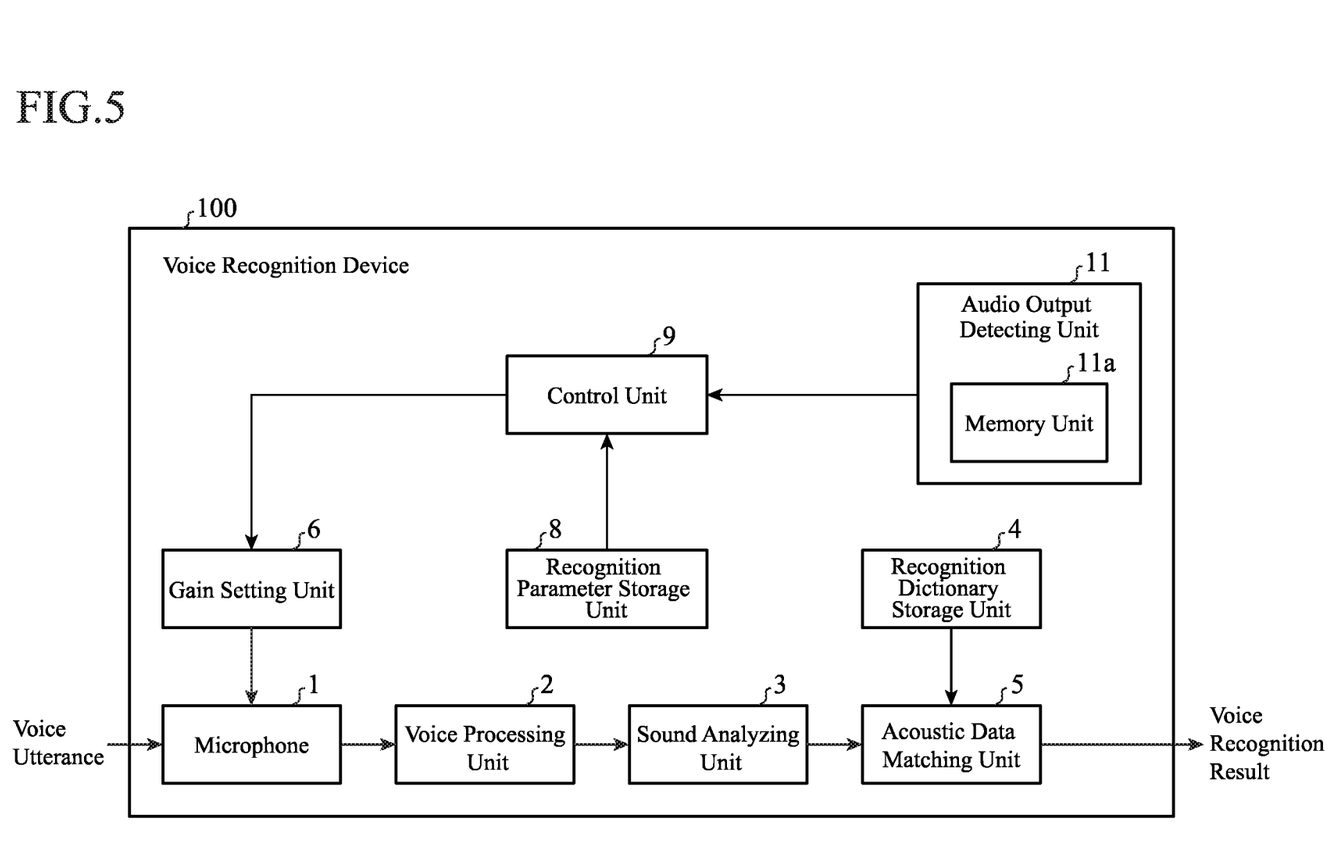
FIG. 5 is a block diagram showing a configuration of a voice recognition device according to Embodiment 2.

FIG. 5 is a block diagram showing a configuration of a voice recognition device according to Embodiment 2 of the invention.

In FIG. 5, an audio output detecting unit 11 is provided in place of the vehicle state detecting unit 7 shown in FIG. 1. However, in the following, like components or elements to those of the voice recognition device according to Embodiment 1 are denoted by the same reference numerals as those used in Embodiment 1, and descriptions thereof will be omitted or simplified.

The audio output detecting unit 11 detects an output volume from an audio device (not shown) installed within the vehicle, and outputs the detected volume to the control unit 9 as volume information. Incidentally, as a configuration to acquire the volume information from the audio, information such as a volume value may be acquired directly from the connected audio device, or the audio played in the vehicle may be collected by a microphone (not shown) different from the microphone 1 to thus calculate the volume information. Also, the audio output detecting unit 11 has a memory unit 11a for storing the acquired volume information.

The control unit 9 refers to the volume information detected by the audio output detecting unit 11, and determines whether the vehicle is in a steady operation state or in an abnormal operation state. The steady operation state in Embodiment 2 is a state in which the audio output volume is less than a threshold and does not affect the utterance volume of a user. On the other hand, the abnormal operation state is a state in which the audio output volume is not less than the threshold and affects the utterance volume of the use. The control unit 9 has a determination table in which the threshold of the output volume of the audio is set, and determines whether the vehicle is in the steady operation state or in the abnormal operation state based on whether the volume information detected by the audio output detecting unit 11 is not less than the threshold. Further, the control unit 9 refers to a parameter table stored in the recognition parameter storage unit 8, and acquires a parameter value according to a driving situation of the vehicle. The gain setting unit 6 sets the parameter values acquired by the control unit 9 to the microphone 1. The recognition parameter to be set includes a microphone gain value of the microphone 1, for example.

The microphone gain value will be described with the parameter table of FIG. 2 shown in the foregoing Embodiment 1 as an example. When it is determined that the vehicle is in the steady operation state (the output volume of the audio is less than the threshold), it is set to 10 dB, and when the vehicle is in the abnormal operation state (the output volume of the audio is not less than the threshold), it is set to a lower value according to the output volume of the audio immediately before a voice recognition start instruction is input. Specifically, when the output volume of the immediately preceding audio is 60 dBA, the microphone gain value is set to 5 dB. Also, when the output volume of the immediately preceding audio is 100 dBA, it can be determined that the user's utterance becomes louder, and therefore the microphone gain value is set to 3 dB.

Next, an operation of the voice recognition device according to Embodiment 2 will be described with reference to a flowchart shown in FIG. 6. However, the same steps as those of the voice recognition device according to Embodiment 1 are denoted by the same reference signs as those used in FIG. 3, and descriptions thereof will be omitted or simplified.

Figure 6:
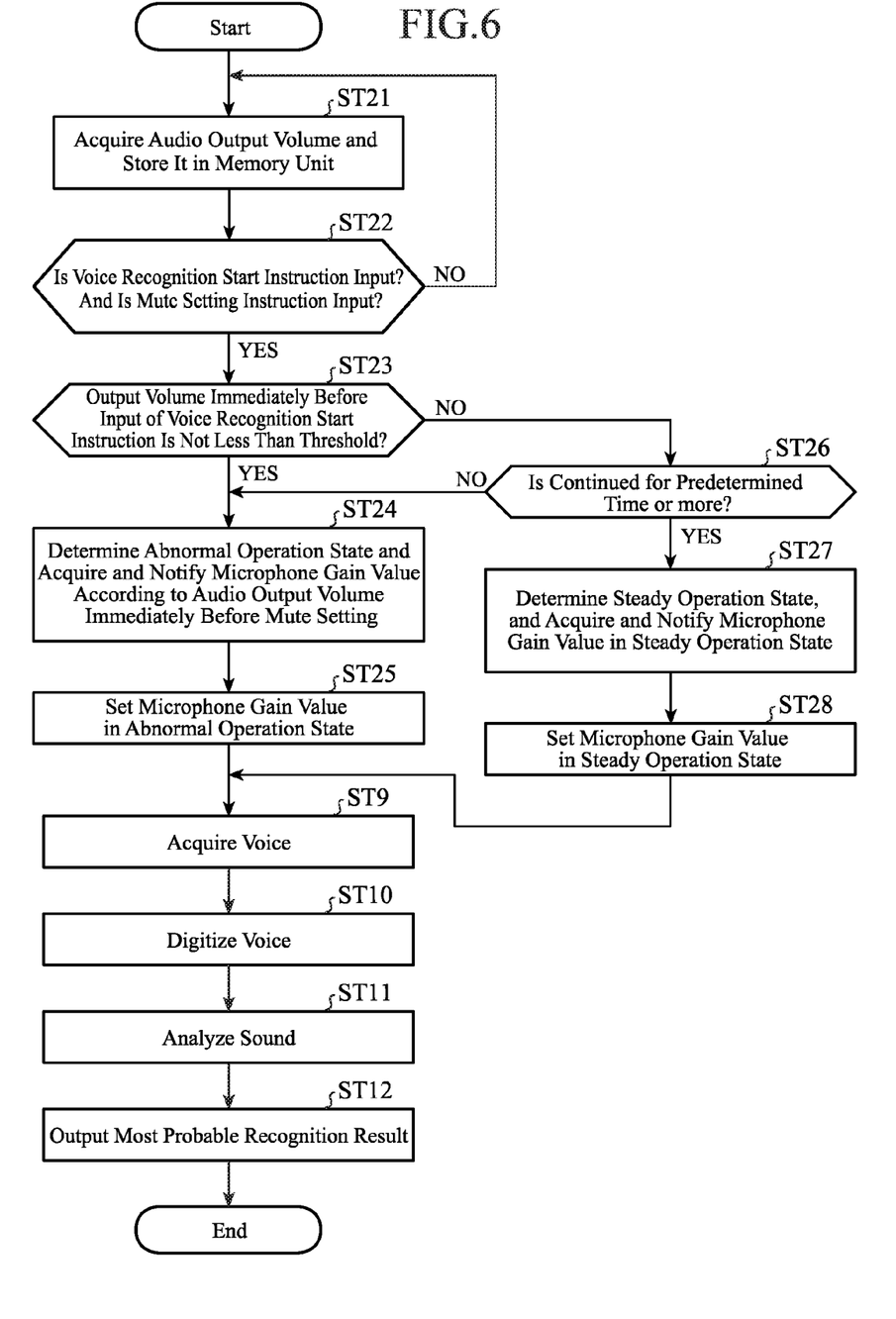
FIG. 6 is a flowchart showing an operation of the voice recognition device according to Embodiment 2.

Also, in the flowchart of FIG. 6, the following configuration is shown: the output volume of the audio is detected; it is determined that the user utters in a louder voice when the corresponding output volume is high, and hence the microphone gain value set in the gain setting unit 6 is reduced.

Also, it is typical of the user to mute (stop) the audio in order to eliminate the effect of the output voice of the audio and maintain the voice recognition performance before or after inputting the voice recognition start instruction; however, it is also possible to perform the voice recognition without setting the audio to mute with a known technique such as a noise canceller. However, in the flowchart of FIG. 6, a description is given of a case where the audio is set to the mute as an example. This is based on a tendency that the user gives utterance in a louder voice when the immediately preceding output volume is higher regardless of whether or not the audio is set to the mute.

The audio output detecting unit 11 detects the output volume of the audio within the vehicle and stores the detected output volume information in the memory unit 11a (Step ST21). On the other hand, the control unit 9 determines whether or not the voice recognition start instruction and the setting instruction of the mute are input (Step ST22). When the voice recognition start instruction and the setting instruction of the mute are not input (Step ST22; NO), the processing returns to Step ST21. In contrast, when the voice recognition start instruction and the setting instruction of the mute are input (Step ST22; YES), the control unit 9 determines whether or not the output volume immediately before the voice recognition start instruction is input among the output volume stored in the memory unit 11a of the audio output detecting unit 11 is input is not less than the threshold (Step ST23).

When the output volume immediately before the voice recognition start instruction is input is not less than the threshold (Step ST23; YES), it is determined that the vehicle is in the abnormal operation state, the microphone gain value corresponding to the output volume immediately before the mute setting instruction is input is acquired by reference to the parameter table, and the acquired value is notified to the gain setting unit 6 (Step ST24). The gain setting unit 6 sets the parameter value in the abnormal operation state notified at Step ST24 to the microphone gain of the microphone 1 (to 5 dB, for example) (Step ST25).

When the output volume immediately before the voice recognition start instruction is input is less than the threshold (Step ST23; NO), it is further determined whether or not the state in which the output volume is less than the threshold continues for a predetermined period or more (Step ST26).

When the state in which the output volume is less than the threshold does not continue for a predetermined period or more (Step ST26; NO), it is determined that the user may still give utterance under the influence of the output volume of the audio, and the processing proceeds to Step ST24.

In contrast, when the state in which the output volume is less than the threshold continues for a predetermined period or more (Step ST26; YES), it is determined that the user does not give utterance under the influence of the output volume of the audio, and the control unit 9 refers to the parameter table and acquires the microphone gain value in the steady operation state, and notifies the acquired value to the gain setting unit 6 (Step ST27). The gain setting unit 6 sets the parameter value in the steady operation state notified at Step ST27 to the microphone gain (to 10 dB, for example) of the microphone 1 (Step ST28). The subsequent processing steps are similar to those from Step ST9 to Step ST12 shown in Embodiment 1.

It is noted that at Step ST26 mentioned above, the time in the determination of whether or not the state in which the output volume is less than the threshold continues for a predetermined time or more is, for example, the period D shown in FIG. 4 according to Embodiment 1, namely a period going back for a predetermined period from the point O where the voice recognition start instruction is input. Incidentally, the time going back from the point O can be changed appropriately.

As described above, according to Embodiment 2, it is configured to include: a recognition parameter storage unit 8 for storing a parameter table in which different setting values are specified according to whether the vehicle is in the steady operation state or in the abnormal operation state; and a control unit 9 that determines that the vehicle is in the abnormal operation state when the output volume of the audio is not less than the threshold, acquires the microphone gain value in the abnormal operation state from the parameter table, and sets the microphone gain of the microphone 1 through the gain setting unit 6, and hence even if the user gives utterance under the influence of the output volume of the audio, the gain is maintained appropriately to thus suppress degradation of a recognition performance.

Incidentally, in the foregoing Embodiment 2, although there is shown the configuration that sets the microphone gain value based on the output volume of the audio, the following configuration may be provided: a frequency analysis of the audio output from an audio device is performed, and the microphone gain value is set based on the output intensity of an output signal having a frequency close to that of a human's voice. As a result, the signal intensity of the audio signal having the frequency close to that of the human's voice to affect the utterance of the user has only to be checked to thus suppress efficiently the degradation of the recognition performance.

Also, in the foregoing Embodiment 2, although there is shown as an example the configuration in which the audio is set to the mute before or after the voice recognition start instruction is input, the voice recognition processing can be performed by the following configuration in the case where it is not set to the mute. For example, two sound collecting units (not shown) are provided in the vicinity of the driver's and passenger seats of the vehicle. Since the audio propagates uniformly in the interior of the vehicle, it is input to the two sound collecting means. On the other hand, the utterance voice of the driver is input to only the sound collecting means in the vicinity of the driver's seat. Thus, the voices input to the two sound collecting means are subtracted therefrom, and the thus obtained voice is used for the utterance voice of the driver. Incidentally, a distinction between the audio and the utterance voice of the user may be adapted by a different method.

Embodiment 3

In the foregoing Embodiments 1 and 2, there is shown the configuration in which the value of the recognition parameter is set corresponding to the vehicle state or the output volume of the audio; however, in Embodiment 3, there is shown a configuration in which the voice recognition processing is stopped according to the vehicle state.

Figure 7:
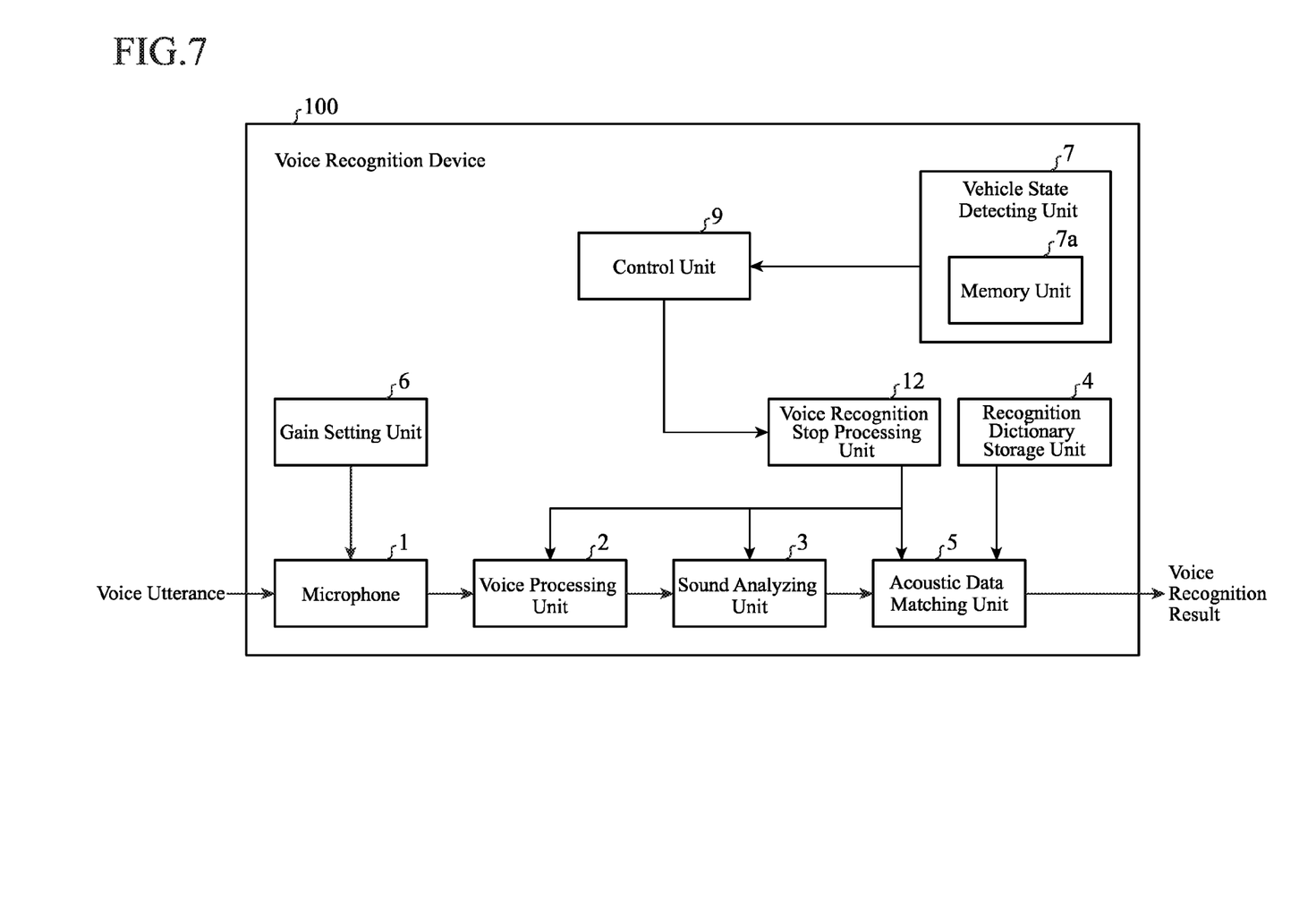
FIG. 7 is a block diagram showing a configuration of a voice recognition device according to Embodiment 3.

FIG. 7 is a block diagram showing a configuration of a voice recognition device according to Embodiment 3. In FIG. 7, a voice recognition stop processing unit 12 is provided in place of the recognition parameter setting unit 10 shown in FIG. 1. In the following, like components or elements to those of the voice recognition device according to Embodiment 1 are denoted by the same reference numerals as those used in Embodiment 1, and descriptions thereof will be simplified or omitted.

In addition to the detection of the vehicle speed according to Embodiment 1, a vehicle state detecting unit 7 performs detection of vehicle states such as a steering wheel turning angle, a steering wheel rotational speed, an ON/OFF state of winkers, and a traveling direction of the vehicle and entry thereof into an intersection from current position information with a GPS signal. Note that the current position information with the GPS signal may be calculated in the vehicle state detecting unit 7 or acquired from the outside. Based on detection results of the vehicle state detecting unit 7, the control unit 9 determines whether or not the user is in a situation to concentrate on the driving, and when determining the situation to concentrate on the driving, the control unit outputs a stop instruction of the voice recognition. Based on the stop instruction of the voice recognition to be input from the control unit 9, the stop processing unit 12 outputs a stop signal to a voice processing unit 2, a sound analyzing unit 3 and an acoustic data matching unit 5, and then the processing relating to the voice recognition is stopped. Further, an audio-output or display-output is performed via an external speaker (not shown) or an external display (not shown) to the effect that the voice recognition is stopped.

Next, an operation of the voice recognition device 100 according to Embodiment 3 will be described with reference to a flowchart of FIG. 8. It is noted that in the flowchart of FIG. 8, the following case is shown as an example: the steering wheel turning angle is detected as vehicle information, it is determined that the user should concentrate on manipulating the steering wheel in the case where the corresponding steering wheel turning angle is greater, and hence the voice recognition processing is stopped.

The vehicle state detecting unit 7 continuously acquires the steering wheel turning angle of the vehicle via an in-vehicle network, and stores the acquired turning angle information in the memory unit 7a (Step ST31).

Meanwhile, the control unit 9 determines whether or not a voice recognition start instruction is input (Step ST32). If no voice recognition start instruction is input (Step ST32; NO), the processing returns to Step ST31. In contrast, if the voice recognition start instruction is input (Step ST32; YES), the control unit 9 determines whether or not the steering wheel turning angle is not less than a threshold at a point of time when the voice recognition start instruction is input among the steering wheel turning angles stored in the memory unit 7a of the vehicle state detecting unit 7 (Step ST33).

If the steering wheel turning angle is not less than the threshold (Step ST33; YES), the control unit 9 determines that since the vehicle is running on a curve or the like, the user should concentrate on manipulating the steering wheel, and outputs the stop instruction of the voice recognition to the voice recognition stop processing unit 12 (Step ST34). According to the stop instruction input at Step ST34, the voice recognition stop processing unit 12 outputs the stop signal to the voice processing unit 2, the sound analyzing unit 3, and the acoustic data matching unit 5 to stop the processing relating to the voice recognition, and causes an external speaker (not shown) to output or causes an external display (not shown) to display a response message such that "Voice recognition service is now unavailable. Please concentrate on driving." (Step ST35).

When the steering wheel turning angle is less than the threshold (Step ST33; NO), the control unit 9 further acquires the steering wheel turning angle stored in the memory unit 7a of the vehicle state detecting unit 7, and determines whether or not a state in which the steering wheel turning angle is less than the threshold continues for a predetermined time or more (Step ST36). When the state in which the steering wheel turning angle is less than the threshold does not continue for a predetermined time or more (Step ST36; NO), it is determined that the user does not escape yet from the state in which the user should concentrate on manipulating the steering wheel, and the processing proceeds to Step ST34. In contrast, when the state in which the steering wheel turning angle is less than the threshold continues for a predetermined time or more (Step ST36; YES), it is determined that the user escapes from the state in which he/she should concentrate on manipulating the steering wheel, and the processing proceeds to Step ST9. The processes subsequent to Step ST9 are similar to those in Embodiment 1.

Incidentally, in the foregoing steps ST34 and ST35, there is shown the configuration in which the processing relating to the voice recognition is stopped and also the response message is output; however, the configuration may be such that the control unit 9 invalidates the acceptance of an operation input of the voice recognition start instruction, and further notifies the voice recognition stop processing unit 12 to the effect that is invalidated, and then the voice recognition stop processing unit 12 displays a warning or makes a beep.

Also, in the foregoing step ST36, the time to determine whether or not the vehicle state in which the steering wheel turning angle is less than the threshold continues for a predetermined time or more is, for example, the period D shown in FIG. 4 according to Embodiment 1, namely a period going back for a predetermined period from a point O where the voice recognition start instruction is input. Incidentally, the time going back from the point O can be changed appropriately.

Figure 8:
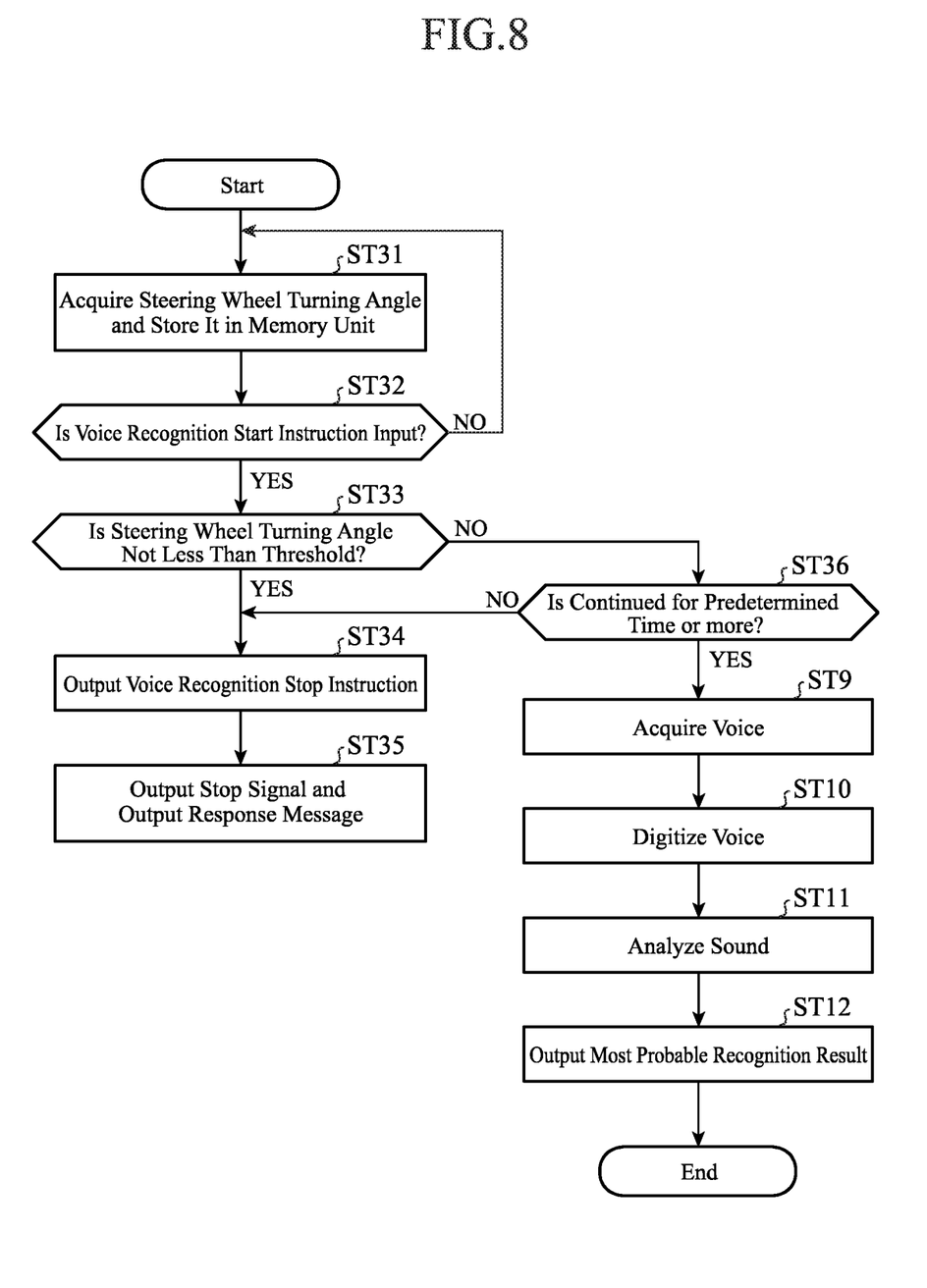
FIG. 8 is a flowchart showing an operation of the voice recognition device according to Embodiment 3.

Also, in the foregoing flowchart of FIG. 8, the following configuration is shown: the steering wheel turning angle is detected as the vehicle information; it is determined that when the detected turning angle is large, the traveling direction of the vehicle is changed greatly to thus stop the processing relating to the voice recognition. However, based on various pieces of vehicle information other than the steering wheel turning angle, the implementation or stop of the voice recognition processing can be controlled.

Specifically, a rotational speed of the steering wheel is detected as the vehicle information, and when an average speed in the rotational speed during a period going back for a predetermined period from the input of the voice recognition start instruction is higher than a threshold, it is determined that the traveling direction of the vehicle is changed greatly to thus stop the processing relating to the voice recognition. Also, the change in the traveling direction of the vehicle can be similarly grasped from the ON/OFF state of the winkers. The detection of the ON/OFF state of the winkers is performed based on presence/absence of a lighting operation of the winkers, an operating sound of the winkers, or the like. Also, the traveling direction of the vehicle can be acquired with the GPS signal, and if a difference between the current traveling direction and the traveling direction in a certain past period is a certain value or more, it is determined that the traveling direction of the vehicle is changed greatly to thus stop the processing relating to the voice recognition.

Further, it is also possible by a known white line detection method to grasp the change in the traveling direction of the vehicle from a difference between the traveling direction of the vehicle and the direction in which the white line on a road extends, which may occur upon a lane change thereof, or by a known entry detection method thereof into an intersection to grasp the change in the traveling direction of the vehicle such that the entry of the vehicle into the intersection is determined. Note that the entry into the intersection is determined by reference to map information or the like. The map information may be stored in a storage area (not shown) provided within the voice recognition device 100, or may be acquired from an external device. Also, by a combination of these signals indicating the turning angle of the steering wheel, the rotational speed of the steering wheel, the ON/OFF state of the winkers, the change in the traveling direction of the vehicle, and the entry of the vehicle into the intersection, the control unit 9 may determine the change in the traveling direction of the vehicle.

As described above, according to Embodiment 3, it is configured to include: a control unit 9 that determines whether or not the user is put in a situation to concentrate on the driving based on the vehicle state detected by the vehicle state detecting unit 7, and outputs the stop instruction of the voice recognition; and the voice recognition stop processing unit 12 that outputs the stop signal based on the stop instruction of the voice recognition output from the control unit 9, thereby stopping the voice recognition processing according to the user's driving situation. As a result, the voice recognition processing that ensures safe driving for the user can be performed.

Incidentally, in the above Embodiment 3, although there is shown the configuration in which the start of the voice recognition is halted according to the vehicle state, it is also possible to provide a configuration to stop the voice recognition processing based on to the vehicle state even if the voice recognition processing is in progress in the microphone 1, the voice processing unit 2, the sound analyzing unit 3 and the acoustic data matching unit 5.

Additionally, in the above Embodiment 3, although there is shown the configuration in which the vehicle state detecting unit 7 acquires the vehicle state, the vehicle state detecting unit 7 may be provided with image analysis means (not shown) as follows: the corresponding image analysis means analyzes an image captured by a camera or the like provided outside the device, a rate of change in the analyzed image is calculated, and it is determined that the traveling direction is changed greatly in the case where the rate of change of the image is not less than a threshold. Also, it may be configured such that it is determined that the change of the vehicle is increased when a specific mark (specific image) appears in the analyzed image.

Figure 9:
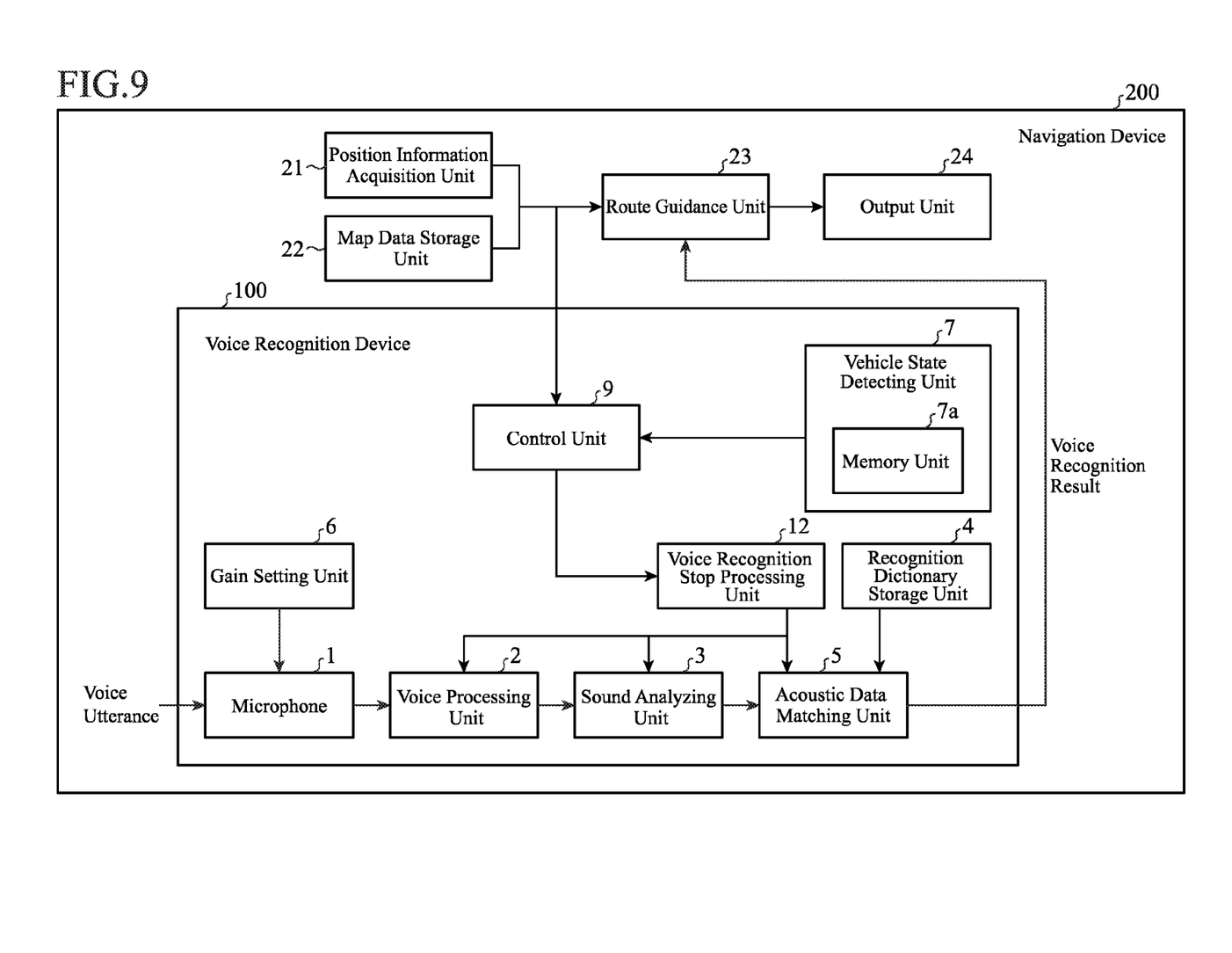
FIG. 9 is a block diagram of a navigation device to which the voice recognition device according to Embodiment 3 is applied.

Further, as shown in FIG. 9, it may be configured as a navigation device 200 mounting the voice recognition device 100 thereon. Note that although FIG. 9 shows a block diagram to which the voice recognition device 100 having the configuration shown in Embodiment 3 is applied, the voice recognition device 100 according to Embodiment 1 and Embodiment 2 may also be applied thereto to configure the navigation device 200.

The navigation device 200 includes the voice recognition device 100, and further includes a position information acquisition unit 21 for acquiring a current position of a host vehicle as a navigation function, a map data storage unit 22 for storing map data, a route guidance unit 23 for generating route guide information by performing route search with the current position and the map data, and an output unit 24 for presenting the generated route guide information to the user by display or sound.

When the user vocally inputs a destination or stopover, the voice recognition device 100 introduces the corresponding input voice into the microphone 1 as voice utterance, and performs voice recognition by any one of the pieced of voice recognition processing illustrated in the foregoing Embodiment 1 to Embodiment 3, and outputs a voice recognition result to the route guidance unit 23. Based on the input voice recognition result, the route guidance unit 23 further performs route search by using position information of the host vehicle to be input from the position information acquisition unit 21, and map data stored in the map data storage unit 22 and then outputs route guide information from the output unit 24.

Further, when the voice recognition device 100 is mounted on the navigation device 200, the configuration may be such that current position information is acquired from the position information acquisition unit 21 to perform detection of the vehicle state such as the traveling direction of the vehicle and entry thereof into the intersection. Similarly, it may be configured to determine the entry of the host vehicle into the intersection by reference to the map data stored in the map data storage unit 22.

As mentioned above, when the voice recognition device 100 is mounted on the navigation device, the route guidance can be carried out with the voice recognition result obtained by the voice recognition processing that is suitable for the driving state of the vehicle, thereby providing the navigation device that assists the user's safe driving. In addition, the route search can be performed with the recognition result with high recognition performance.

It is noted that in the invention, it is possible to freely combine the embodiments, modify any component of the embodiments, or omit any component in the embodiments within the scope of the invention.

INDUSTRIAL APPLICABILITY

The voice recognition device of the invention can be used for improving recognition accuracy of voice recognition processing in a mobile, and can be utilized for assisting safe driving of a user.

EXPLANATION OF REFERENCE NUMERALS 1 microphone, 2 voice processing unit, 3 sound analyzing unit, 4 recognition dictionary storage unit, 5 acoustic data matching unit, 6 gain setting unit, 7 vehicle state detecting unit, 8 recognition parameter storage unit, 9 control unit, 10 recognition parameter setting unit, 11 audio output detecting unit, 12 voice recognition stop processing unit, 7a, 11a memory unit, 21 position information acquisition unit, 22 map data storage unit, 23 route guidance unit, 24 output unit, 100 voice recognition device, 200 navigation device.

The invention claimed is:

1. A voice recognition device comprising:
a sound collecting unit for acquiring an input voice;
a voice processing unit for processing the voice acquired by the sound collecting unit into a digital signal;
a sound analyzing unit for sound-analyzing the voice signal processed by the voice processing unit to convert an acoustic feature into an acoustic feature value indicated in time series;
a recognition dictionary describing a correspondence between the acoustic feature value converted by the sound analyzing unit and recognition vocabulary; and
an acoustic matching unit for matching the acoustic feature value with the recognition dictionary to recognize the voice that is input to the sound collecting unit,
the device further comprising:
a vehicle state detecting unit for detecting a vehicle state of a vehicle having the voice recognition device mounted thereon;
an audio output detecting unit for detecting a volume of a voice signal that is output from an audio device installed within the vehicle;
a gain setting unit for setting a voice acquisition gain of the sound collecting unit;
a recognition parameter setting unit for setting a recognition parameter at the time when the acoustic matching unit recognizes the voice input to the sound collecting unit; and
a control unit for determining whether the vehicle is in a steady operation state or an abnormal operation state based on at least one of the vehicle state detected by the vehicle state detecting unit and the volume detected by the audio output detecting unit, and instructing the recognition parameter setting unit to set the recognition parameter in accordance with whichever of the steady operation state and the abnormal operation state is determined,
wherein the recognition parameter comprises at least one of:
a voice power detection threshold by which is detected a start of the voice input being recognized,
a time out time for detecting an end of the voice input being recognized,
a maximum number of words retained from the voice input being recognized, and
a voice acquisition gain of the sound collecting unit when acquiring the voice input being recognized.

2. A voice recognition device comprising:
a sound collecting unit for acquiring an input voice;
a voice processing unit for processing the voice acquired by the sound collecting unit into a digital signal;
a sound analyzing unit for sound-analyzing the voice signal processed by the voice processing unit to convert an acoustic feature into an acoustic feature value indicated in time series;
a recognition dictionary describing a correspondence between the acoustic feature value converted by the sound analyzing unit and recognition vocabulary; and
an acoustic matching unit for matching the acoustic feature value with the recognition dictionary to recognize the voice that is input to the sound collecting unit,
the device further comprising:
a vehicle state detecting unit for detecting a vehicle state of a vehicle having the voice recognition device mounted thereon;
an audio output detecting unit for detecting a volume of a voice signal that is output from an audio device installed within the vehicle;
a gain setting unit for setting a voice acquisition gain of the sound collecting unit;
a recognition parameter setting unit for setting a recognition parameter at the time when the acoustic matching unit recognizes the voice input to the sound collecting unit;
a voice recognition stop processing unit for stopping the voice recognition processing of at least one of the voice processing unit, the sound analyzing unit, and the acoustic matching unit when the stop of the voice recognition processing is instructed; and
a control unit for instructing the voice recognition stop processing unit to stop the voice recognition processing when the vehicle state detected by the vehicle state detecting unit satisfies a predetermined condition.

3. The voice recognition device according to claim 1, wherein
when the control unit determines that the vehicle is operating in an abnormal operation state, the control unit instructs the recognition parameter setting unit to change the recognition parameter from a steady value to a different value, and
after determining that the vehicle is operating in an abnormal operation state, when the control unit determines that the vehicle has returned to the steady operation state based on a change in the detected vehicle state or the detected volume, the control unit returns the recognition parameter to the steady value.

4. The voice recognition device according to claim 2, wherein when the vehicle state no longer satisfies the predetermined condition and has not satisfied the predetermined condition during a continuous period going back for a predetermined time from a point of time when an operation input of a start of the voice recognition processing is received, the control unit cancels the instruction to stop the voice recognition processing.

5. The voice recognition device according to claim 3, wherein
the recognition parameter is the voice acquisition gain, and
the control unit returns the voice acquisition gain to the steady value when the audio output volume is less than the threshold and the audio output volume continues to be less than the threshold during a period going back for a predetermined time from the point of time when the operation input is received.

6. The voice recognition device according to claim 1, wherein:
the vehicle state detecting unit detects the vehicle state by detecting a vehicle speed of the vehicle; and
upon receiving an operation input to instruct a start of voice recognition processing, the control unit instructs the recognition parameter setting unit to change the recognition parameter when a change in the vehicle speed detected by the vehicle state detecting unit during a period going back for a predetermined time from a point of time when the corresponding operation input is received is not less than a threshold.

7. The voice recognition device according to claim 6, wherein
the recognition parameter is the time-out time for detecting the end of the voice input, and
when the change in the vehicle speed is not less than the threshold, the control unit sets a time-out time for detecting the end of the voice input to a value greater than a value used for the steady operation state.

8. The voice recognition device according to claim 5, wherein the control unit instructs the gain setting unit to set the voice acquisition gain to a value smaller than a steady value when the volume of the voice signal detected by the audio output detecting unit is not less than a threshold.

9. The voice recognition device according to claim 5, wherein upon receiving an operation input to instruct a start of voice recognition processing, the control unit determines whether or not the volume of the voice signal immediately before the reception of the operation input is not less than the threshold.

10. The voice recognition device according to claim 2, wherein the vehicle state detecting unit detects a turning angle or rotational speed of a steering wheel of the vehicle, and the control unit gives an instruction to stop the voice recognition processing when the steering wheel turning angle or rotational speed acquired by the vehicle state detecting unit is not less than the threshold.

11. The voice recognition device according to claim 2, wherein:
   the vehicle state detecting unit acquires lighting information of blinkers of the vehicle; and
   the control unit gives an instruction to stop the voice recognition processing when the blinkers are lit.

12. The voice recognition device according to claim 2, wherein:
   the vehicle state detecting unit acquires traveling direction information of the vehicle; and
   the control unit refers to the traveling direction information acquired by the vehicle state detecting unit, and gives an instruction to stop the voice recognition processing when a difference between a past traveling direction of the vehicle and a current traveling direction of the vehicle is not less than a threshold.

13. The voice recognition device according to claim 2, wherein:
   the vehicle state detecting unit acquires traveling direction information of the vehicle and white line information on a road; and
   the control unit refers to the traveling direction information and white line information acquired by the vehicle state detecting unit, and gives an instruction to stop the voice recognition processing when a difference between the traveling direction of the vehicle and an extending direction of the white line is not less than a threshold.

14. A voice recognition device
   a sound collecting unit for acquiring an input voice;
      a voice processing unit for processing the voice acquired by the sound collecting unit into a digital signal;
      a sound analyzing unit for sound-analyzing the voice signal processed by the voice processing unit to convert an acoustic feature into an acoustic feature value indicated in time series;
      a recognition dictionary describing a correspondence between the acoustic feature value converted by the sound analyzing unit and recognition vocabulary; and
      an acoustic matching unit for matching the acoustic feature value with the recognition dictionary to recognize the voice that is input to the sound collecting unit,
   the device further comprising:
   a vehicle state detecting unit for detecting a vehicle state of a vehicle having the voice recognition device mounted thereon;
   an audio output detecting unit for detecting a volume of a voice signal that is output from an audio device installed within the vehicle;
   a gain setting unit for setting a voice acquisition gain of the sound collecting unit;
   a recognition parameter setting unit for setting a recognition parameter at the time when the acoustic matching unit recognizes the voice input to the sound collecting unit;
   a voice recognition stop processing unit for stopping the voice recognition processing of at least one of the voice processing unit, the sound analyzing unit, and the acoustic matching unit when the stop of the voice recognition processing is instructed; and
   a control unit for instructing the recognition parameter setting unit to change the recognition parameter or instructing the voice recognition stop processing unit to stop the voice recognition processing when the vehicle state detected by the vehicle state detecting unit or the volume of the voice signal detected by the audio output detecting unit satisfies a predetermined condition,
   wherein the control unit refers to traveling direction information acquired by the vehicle state detecting unit, or map information and current position information of the vehicle,
   when, upon referring to the traveling direction information, the control unit determines that a difference between a past traveling direction of the vehicle and a current traveling direction of the vehicle is not less than a threshold, the control unit gives an instruction to stop the voice recognition processing, and
   when, upon referring to the map information and the current position information, the control unit determines that the vehicle enters an intersection, the control unit gives an instruction to stop the voice recognition processing.

15. The voice recognition device according to claim 2, wherein when an instruction to stop the voice recognition processing is given to the voice recognition stop processing unit, the control unit invalidates the acceptance of an operation input to instruct a start of the voice recognition.

\* \* \* \* \*